United States Patent
Cho

(10) Patent No.: US 12,496,954 B2
(45) Date of Patent: Dec. 16, 2025

(54) VEHICLE WITH TELESCOPIC BOARDING RAMP

(71) Applicant: TOYOTA JIDOSHA KABUSHIKI KAISHA, Toyota (JP)

(72) Inventor: Hirofumi Cho, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 798 days.

(21) Appl. No.: 17/876,763

(22) Filed: Jul. 29, 2022

(65) Prior Publication Data

US 2023/0092127 A1    Mar. 23, 2023

(30) Foreign Application Priority Data

Sep. 21, 2021  (JP) ................................. 2021-153132

(51) Int. Cl.
  *B60P 1/04*   (2006.01)
  *B60K 1/04*   (2019.01)
  *B60P 1/43*   (2006.01)

(52) U.S. Cl.
  CPC ............. *B60P 1/431* (2013.01); *B60K 1/04* (2013.01); *B60K 2001/0438* (2013.01)

(58) Field of Classification Search
  CPC .... B60P 1/431; B60K 1/04; B60K 2001/0438
  USPC ................................................. 14/69.5–72.5
  See application file for complete search history.

(56) References Cited

U.S. PATENT DOCUMENTS

| | | | | |
|---|---|---|---|---|
| 3,730,361 A | * | 5/1973 | Haynes .................... | B60P 1/431 14/71.1 |
| 3,870,170 A | * | 3/1975 | Noble ...................... | B60P 1/431 414/537 |
| 4,078,678 A | * | 3/1978 | Tordella ................... | B60P 1/431 414/537 |
| 4,189,187 A | * | 2/1980 | Rassmann ................ | E21C 27/32 299/34.1 |
| 4,294,571 A | * | 10/1981 | Tordella ................... | B60P 1/003 414/537 |
| 4,624,619 A | * | 11/1986 | Uher ........................ | B60P 1/431 296/61 |
| 4,900,217 A | * | 2/1990 | Nelson ..................... | B60P 1/431 14/71.1 |

(Continued)

FOREIGN PATENT DOCUMENTS

| | | |
|---|---|---|
| JP | 2015-189433 A | 11/2015 |
| JP | 2019-116112 A | 7/2019 |

(Continued)

*Primary Examiner* — Raymond W Addie
(74) *Attorney, Agent, or Firm* — Oliff PLC

(57) ABSTRACT

A vehicle includes: a floor where an occupant is located during a ride in the vehicle; a high voltage unit located below the floor; a ramp configured to move between an in-use position and a storage position; and an actuator that moves the ramp between the in-use position and the storage position. The ramp includes a distal end that contacts the ground when the ramp is in the in-use position, and a base end located on the opposite side of the ramp from the distal end. When the ramp is in the storage position, the base end of the ramp is adjacent to the actuator in a horizontal direction. A tilted surface tilted upward from the base end of the ramp toward the actuator is located between the base end of the ramp and the actuator.

12 Claims, 4 Drawing Sheets

(56) References Cited

U.S. PATENT DOCUMENTS

| | | | | |
|---|---|---|---|---|
| 5,305,486 A * | 4/1994 | Smith | ............... | A61G 3/067 14/70 |
| 5,380,144 A * | 1/1995 | Smith | ............... | A61G 3/061 14/71.3 |
| 5,676,515 A * | 10/1997 | Haustein | ............ | B60P 1/431 414/921 |
| 5,795,125 A * | 8/1998 | Walkden | ............ | B60P 1/431 14/71.1 |
| 5,907,276 A * | 5/1999 | Lance | ............... | B60P 1/435 296/61 |
| 6,042,923 A * | 3/2000 | Lewis | ............... | B60P 1/433 428/68 |
| 6,431,815 B1 * | 8/2002 | Zarzecki | ............ | B60P 1/431 414/552 |
| 6,802,095 B1 * | 10/2004 | Whitmarsh | ........ | B60P 1/433 14/71.3 |
| 7,802,337 B2 * | 9/2010 | van Roosmalen | .... | E04F 11/002 14/71.1 |
| 8,286,290 B2 * | 10/2012 | Kim | ............... | B65G 69/2864 14/71.3 |
| 8,555,443 B2 * | 10/2013 | Couto | ............... | B60P 1/431 14/71.1 |
| 10,994,795 B1 * | 5/2021 | Perez | ............... | B60K 15/067 |
| 2004/0117927 A1 * | 6/2004 | Gleason | ............ | B65G 69/2835 14/71.3 |
| 2004/0226116 A1 * | 11/2004 | O'Donnell | ......... | B60P 1/431 14/69.5 |
| 2009/0108614 A1 * | 4/2009 | Washington | ........ | B60P 1/435 296/61 |
| 2009/0151094 A1 * | 6/2009 | Sahr | ............... | A61G 3/062 14/71.3 |
| 2011/0072596 A1 * | 3/2011 | Kenny | ............... | B60P 1/435 296/61 |
| 2015/0273996 A1 * | 10/2015 | Onodera | ............ | B60L 50/64 429/100 |
| 2016/0052693 A1 * | 2/2016 | Cheng | ............... | B65D 81/245 426/410 |
| 2019/0193620 A1 | 6/2019 | Matsuoka et al. | | |
| 2020/0406751 A1 | 12/2020 | Ide et al. | | |

FOREIGN PATENT DOCUMENTS

| | | |
|---|---|---|
| JP | 2019-172042 A | 10/2019 |
| JP | 2021-004021 A | 1/2021 |
| JP | 2021-008139 A | 1/2021 |

\* cited by examiner

VEHICLE WITH TELESCOPIC BOARDING RAMP

CROSS-REFERENCE TO RELATED APPLICATION

This application claims priority to Japanese Patent Application No. 2021-153132 filed on Sep. 21, 2021, incorporated herein by reference in its entirety.

BACKGROUND

1. Technical Field

The technology disclosed herein relates to vehicles.

2. Description of Related Art

Japanese Unexamined Patent Application Publication No. 2021-8139 (JP 2021-8139 A) discloses a vehicle with a ramp. The ramp is usually stored under the floor of the vehicle. The ramp is deployed from and retracted to a position under the floor during opening of doors, and is used to, for example, load and unload a wheelchair passenger.

SUMMARY

One way to make more space in a vehicle cabin of the above vehicle is to place a high voltage unit (e.g., a traction battery unit) under the floor of the vehicle. However, in the event of, for example, a collision with another vehicle, the ramp stored under the floor may be bent by a horizontal collision load. In this case, the bent ramp may damage the high voltage unit that is also located under the floor.

The present specification provides a technology for placing both a ramp and a high voltage unit under the floor of a vehicle. As used herein, the term "high voltage" means a direct current (DC) operating voltage of more than 60 volts or an alternating current (AC) operating voltage of more than 30 volts (effective value), and the term "high voltage components" broadly means components that operate at such an operating voltage.

A vehicle according to one aspect of the technology disclosed in the present specification includes: a floor where an occupant is located during a ride in the vehicle; a high voltage unit located below the floor; a ramp configured to move between an in-use position where the ramp extends between the floor and ground and a storage position where the ramp is stored at a position between the high voltage unit and the floor; and an actuator that moves the ramp between the in-use position and the storage position. The ramp includes a distal end that contacts the ground when the ramp is in the in-use position, and a base end located on an opposite side of the ramp from the distal end. When the ramp is in the storage position, the base end of the ramp is adjacent to the actuator in a horizontal direction. A tilted surface tilted upward from the base end of the ramp toward the actuator is located between the base end of the ramp and the actuator.

In the above vehicle, the base end of the ramp is adjacent to the actuator in the horizontal direction when the ramp is in the storage position. Moreover, the tilted surface tilted upward from the base end of the ramp toward the actuator is located between the base end of the ramp and the actuator. According to this configuration, the ramp is pushed in toward the actuator when a collision load is applied to the distal end of the ramp. At this time, the base end of the ramp is into contact with the tilted surface, so that the ramp is guided obliquely upward along the tilted surface. A compressive force applied to the ramp is thus reduced, and bending of the ramp is reduced. As bending of the ramp is reduced, damage to the high voltage unit can be avoided or reduced.

The vehicle according to the above aspect may further include an actuator housing that houses the actuator. The tilted surface may be provided at the actuator housing.

In the vehicle according to the above aspect, the tilted surface may have higher rigidity than at least one other surface of the actuator housing.

In the vehicle according to the above aspect, the actuator may be an electric motor.

In the vehicle according to the above aspect, the actuator may be located below the floor, and there may be a clearance between the actuator and the floor.

In the vehicle according to the above aspect, when the ramp is in the storage position, an extended plane extended from a lower surface of the ramp toward the tilted surface may intersect the tilted surface.

In the vehicle according to the above aspect, the tilted surface may be tilted at an angle of 60 degrees or less with respect to the ramp in the storage position.

In the vehicle according to the above aspect, the tilted surface may be curved concavely as viewed from the ramp.

In the vehicle according to the above aspect, a corner of the base end of the ramp that faces the tilted surface may have a chamfered shape.

In the vehicle according to the above aspect, the base end of the ramp may have higher strength than the distal end of the ramp.

The vehicle according to the above aspect may further include a motor that drives a wheel. The high voltage unit may be a battery unit that supplies power to the motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows a modification of a tilted surface 30a; and

FIG. 7 shows another modification of a tilted surface 30a.

DETAILED DESCRIPTION OF EMBODIMENTS

Figure 1:
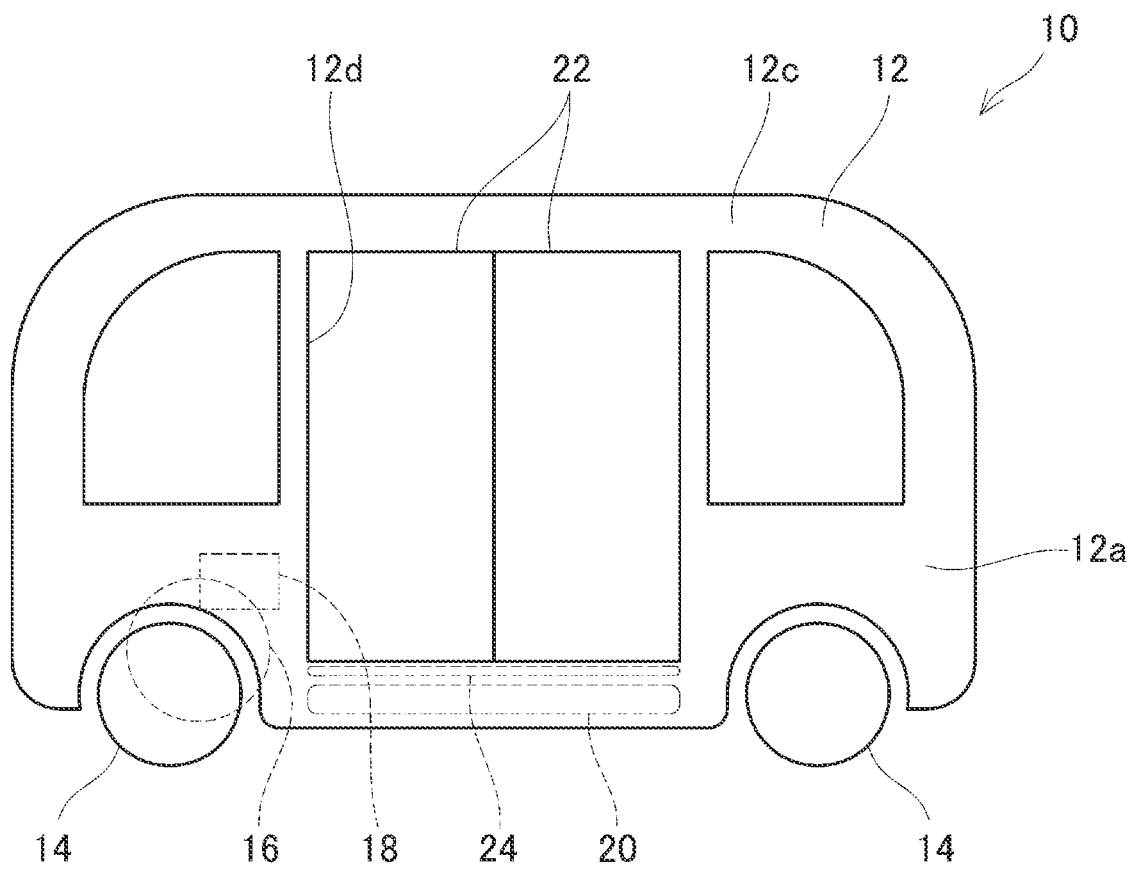
FIG. 1 schematically shows a configuration of a vehicle 10.

In one embodiment of the technology, the vehicle may further include an actuator housing that houses the actuator. In this case, the tilted surface may be provided at the actuator housing. In another embodiment, a part of the tilted surface or the entire tilted surface may be provided between the actuator and the ramp at a member different from the actuator housing. The actuator may be, for example an electric motor.

In one embodiment of the technology, the tilted surface may have higher rigidity than at least one other surface of the actuator housing. This configuration can reduce deformation of the tilted surface that occurs when the ramp is into contact with the tilted surface, so that the ramp can be stably guided obliquely upward.

In one embodiment of the technology, the tilted surface may be tilted at an angle of 60 degrees or less or at an angle of 45 degrees or less with respect to the ramp in the storage position. In addition, or alternatively, the tilted surface may be curved concavely as viewed from the ramp. According to this configuration, the ramp can be guided obliquely upward more stably when the ramp is into contact with the tilted surface.

In one embodiment of the technology, the actuator may be located below the floor, and there may be a clearance between the actuator and the floor. According to this configuration, the ramp guided along the tilted surface can be retracted to the clearance between the actuator and the floor. This configuration can further reduce bending of the ramp.

In one embodiment of the technology, when the ramp is in the storage position, an extended plane extended from a lower surface of the ramp toward the tilted surface may intersect the tilted surface. According to this configuration, the ramp can be guided obliquely upward more stably when the ramp is into contact with the tilted surface.

In one embodiment of the technology, one or more corners of the base end of the ramp that face the tilted surface may have a chamfered shape. According to this configuration, the ramp can be guided obliquely upward more stably when the ramp is into contact with the tilted surface.

In one embodiment of the technology, the base end of the ramp may have higher strength than the distal end of the ramp. Increasing the strength of the base end of the ramp can reduce deformation of the base end of the ramp that occurs when the base end of the ramp is into contact with the tilted surface. As a result, the ramp can be guided along the tilted surface more stably.

In one embodiment of the technology, the vehicle may further include a motor that drives a wheel. In this case, the high voltage unit may be a battery unit that supplies power to the motor.

Embodiment

A vehicle 10 of an embodiment will be described with reference to FIGS. 1 to 5. In the drawings, the direction FR indicates forward in the longitudinal direction of the vehicle 10, and the direction RR indicates rearward in the longitudinal direction of the vehicle 10. The direction LH indicates leftward in the lateral direction (or width direction) of the vehicle 10, and the direction RH indicates rightward in the lateral direction of the vehicle 10. The direction UP indicates upward in the vertical direction of the vehicle 10, and the direction DW indicates downward in the vertical direction of the vehicle 10. The directions used in the specification such as a "longitudinal direction," a "lateral direction," a "vertical direction," "front (forward)," "rear (rearward)," "left (leftward)," "right (rightward)," "upper (upward)," and "lower (downward)" indicate the directions with respect to the vehicle 10.

As shown in FIG. 1, the vehicle 10 is a rideshare bus with a ramp 24. The vehicle 10 includes a vehicle body 12, a plurality of wheels 14 that supports the vehicle body 12, and a pair of boarding doors 22 (hereinafter referred to as the "doors 22"). The vehicle body 12 is generally in the shape of a box. A vehicle cabin 12c is defined inside the vehicle body 12. The vehicle body 12 has a door opening 12d on a left side 12a. The doors 22 are attached to the door opening 12d of the vehicle body 12. The doors 22 are swinging doors that open in opposite directions (i.e., in the longitudinal direction of the vehicle 10) outside the vehicle body 12. When the doors 22 are opened, occupants can enter the vehicle cabin 12c. The wheels 14 are rotatably attached to the vehicle body 12. The wheels 14 include a pair of front wheels and a pair of rear wheels. The number of wheels 14 is not limited to four.

The vehicle 10 of the present embodiment is an electrified vehicle such as a battery electric vehicle, a hybrid electric vehicle, or a fuel cell electric vehicle. The vehicle 10 includes a drive motor 16, a power control unit (PCU) 18, and a battery unit 20. The drive motor 16 drives at least one of the wheels 14 (e.g., a pair of front wheels). The battery unit 20 is connected to the drive motor 16 via the PCU 18. The PCU 18 includes a power converter (not shown) such as a direct current-to-direct current (DC-to-DC) converter and/or an inverter, and can adjust the power that is supplied from the battery unit 20 to the drive motor 16. The battery unit 20 includes a case (not shown) and a plurality of battery cells (not shown) housed in the case. The battery unit 20 supplies power to the drive motor 16. The drive motor 16, the PCU 18, and the battery unit 20 are so-called high voltage components. That is, the drive motor 16, the PCU 18, and the battery unit 20 are electrical components that operate at a DC voltage of more than 60 volts or an AC voltage of more than 30 volts (effective value).

Figure 3:
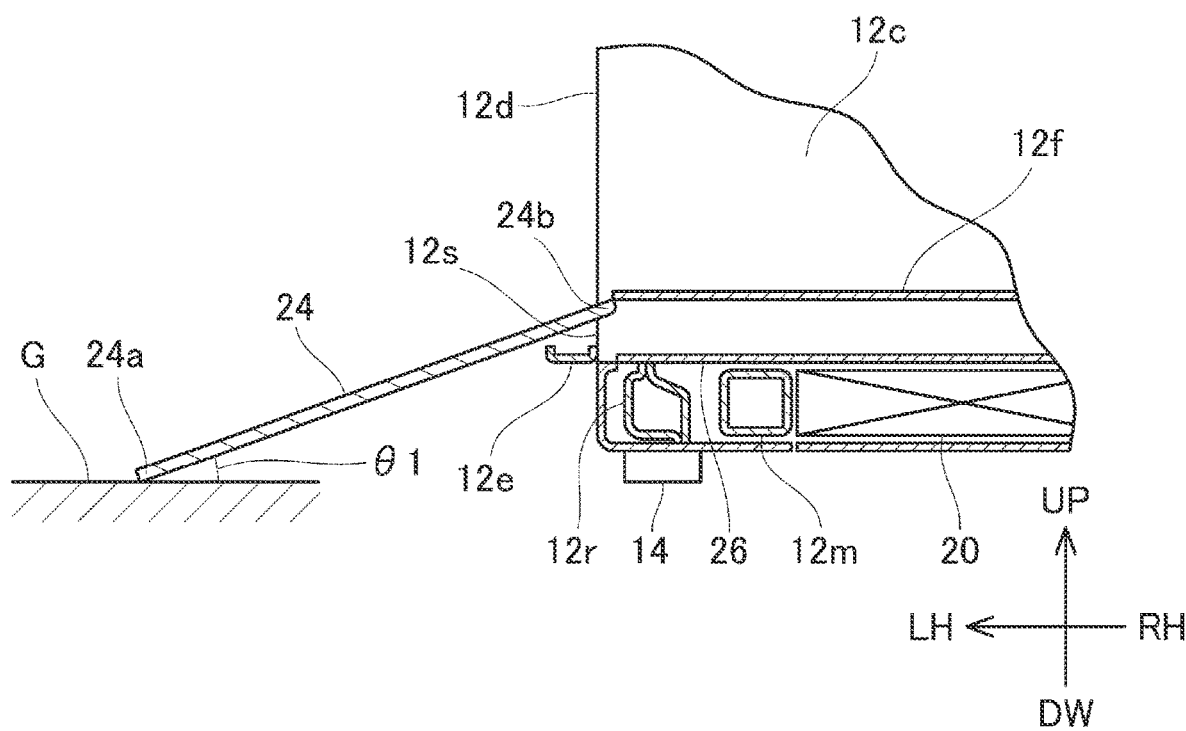
FIG. 3 is an end view of the vehicle 10 in which the ramp 24 is in an in-use position.

The vehicle body 12 has, but not particularly limited to, a frame structure. As shown in FIG. 3, the vehicle body 12 includes a main frame 12m, a pair of rockers 12r, and a floor 12f in the lower part of the vehicle body 12. The floor 12f is a plate member that partially defines the vehicle cabin 12c where occupants are located during their ride in the vehicle 10. The floor 12f extends from the left side 12a to a right side 12b located on the opposite side of the vehicle 10 from the left side 12a. The main frame 12m and the rockers 12r are located under the floor 12f. The main frame 12m is a frame member extending in the longitudinal direction and having the shape of a ladder. The rockers 12r extend in the longitudinal direction of the vehicle 10 and are located outside the main frame 12m in the lateral direction of the vehicle 10. The rockers 12r protect the main frame 12m. As an example, the vehicle body 12 is mainly made of metal.

The battery unit 20 is located below the floor 12f and inside the main frame 12m. The battery unit 20 herein is an example of the "high voltage unit" in the technology disclosed in the present specification.

The vehicle 10 includes a ramp storage portion 26, an electric motor 28, and a motor housing 30 in addition to the ramp 24. The ramp 24, the ramp storage portion 26, the electric motor 28, and the motor housing 30 are located below the floor 12f. The ramp 24 is deployed from and retracted to a position under the floor 12f and is used to, for example, load and unload a wheelchair passenger. The ramp 24 is driven by, but not particularly limited to, the electric motor 28. The electric motor 28 is housed in the motor housing 30. The electric motor 28 herein is an example of the "actuator" in the technology disclosed in the present specification. The motor housing 30 herein is an example of the "actuator housing" in the technology disclosed in the present specification.

Figure 5:
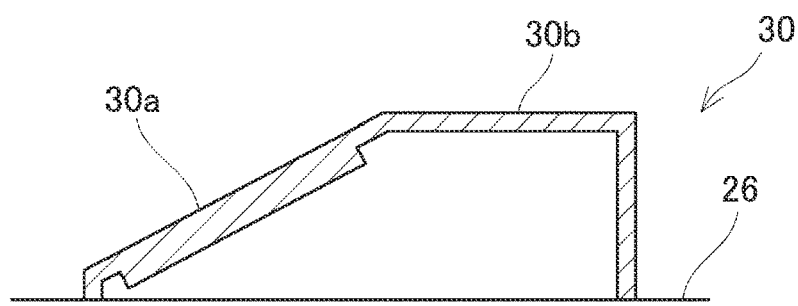
FIG. 5 is a sectional view of a motor housing 30 taken along a plane perpendicular to the longitudinal direction of the vehicle 10.

The ramp 24 is a generally plate-shaped member. The ramp 24 includes a distal end 24a and a base end 24b located on the opposite side of the ramp 24 from the distal end 24a. The ramp storage portion 26 is generally a plate member and extends along the floor 12f. The ramp storage portion 26 is located under the floor 12f, and stores the ramp 24 inside the vehicle body 12. The motor housing 30 is located on a right end 26b of the ramp storage portion 26. As shown in FIG. 5, the motor housing 30 is a cover member composed of a plate member. The motor housing 30 is made of, for example, metal.

Figure 2:
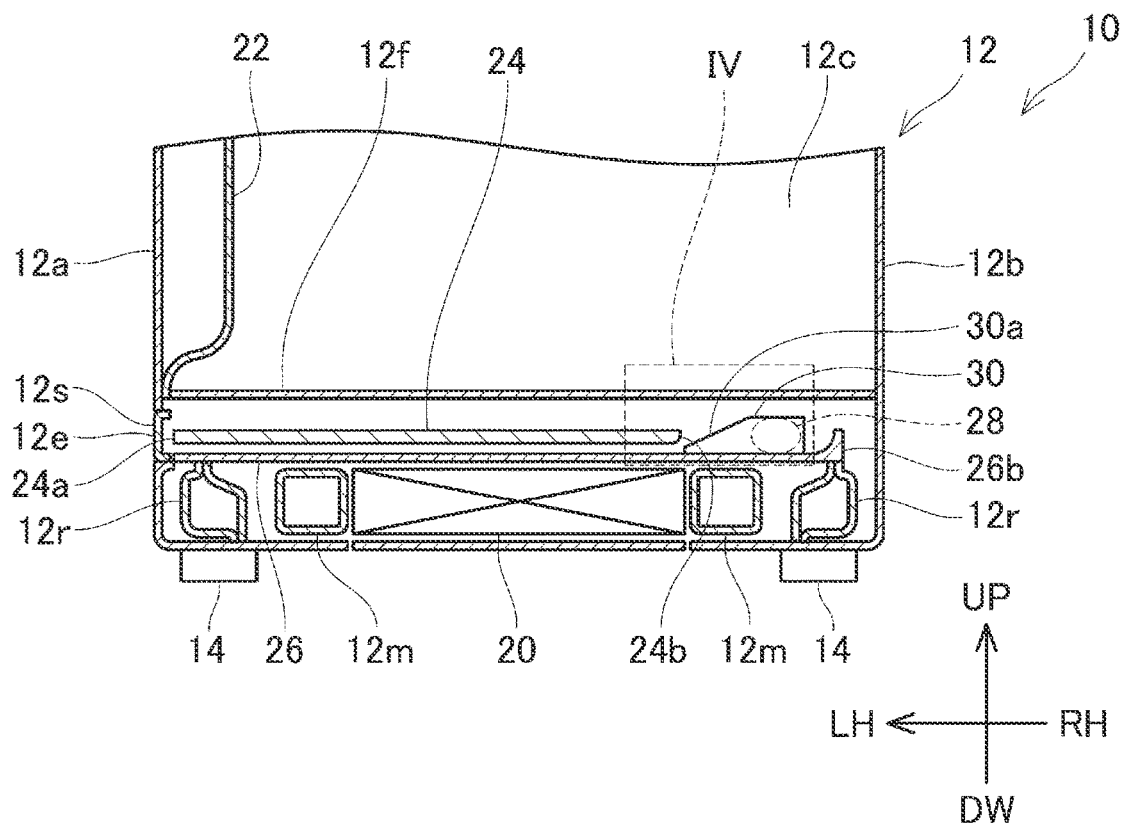
FIG. 2 is an end view of the vehicle 10 in which a ramp 24 is in a storage position.

As shown in FIGS. 2 and 3, the ramp 24 is configured to move between a storage position and an in-use position. When the ramp 24 is in the storage position (see FIG. 2), the ramp 24 is stored inside the vehicle body 12 and is located between the battery unit 20 and the floor 12f. At this time, the base end 24b of the ramp 24 is horizontally adjacent to the motor housing 30 housing the electric motor 28. On the other hand, when the ramp 24 is in the in-use position, the ramp 24 extends between the floor 12f and the ground G. At this time, the distal end 24a of the ramp 24 is in contact with the ground G, and the base end 24b of the ramp 24 is located near the left end of the floor 12f. When the ramp 24 is in the in-use position, the tilt angle θ1 of the ramp 24 with respect to the ground G may be, for example, 5 degrees to 30 degrees.

As described above, the ramp 24 is configured to slide and move between the in-use position and the storage position. The ramp storage portion 26 is provided with, but not particularly limited to, a pair of rails (not shown) extending in the lateral direction. The ramp 24 is slidably supported by the rails and is connected to the electric motor 28 via a transmission mechanism such as a belt mechanism. The ramp 24 is thus powered by the electric motor 28 to move between the in-use position and the storage position. When the ramp 24 moves from the storage position to the in-use position, the ramp 24 is pushed out to the left of the vehicle body 12 through a ramp opening 12s of the vehicle body 12. The ramp opening 12s is provided with a movable ramp lid 12e. The ramp lid 12e opens and closes the ramp opening 12s along with the operation of the ramp 24.

Figure 4:
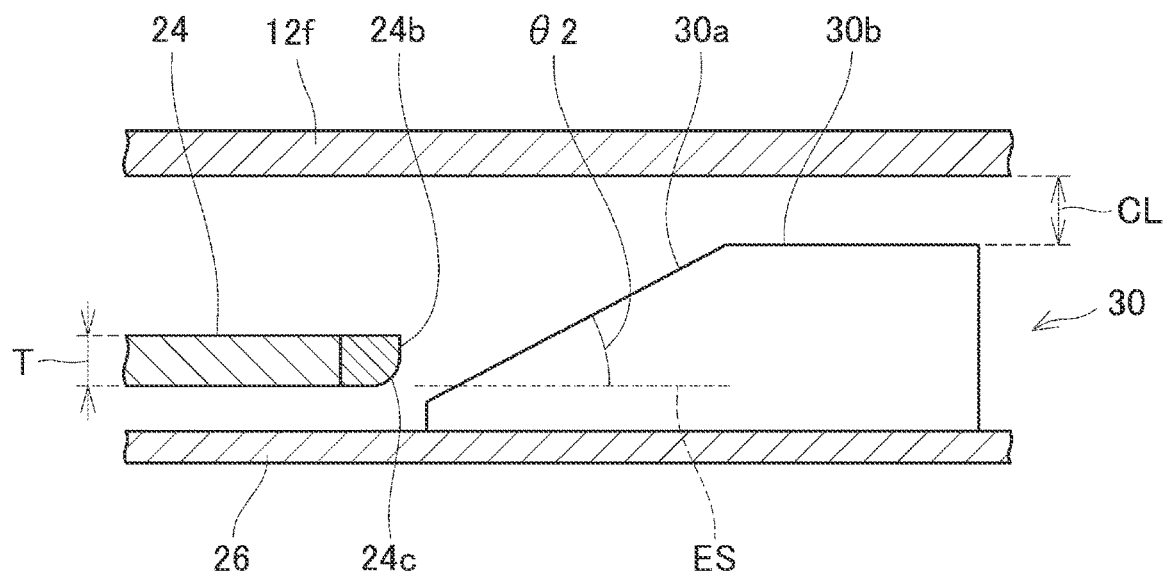
FIG. 4 is an enlarged view of a portion IV in FIG. 2.

Next, the motor housing 30 when the ramp 24 is in the storage position and the detailed configuration of the ramp 24 will further be described mainly with reference to FIGS. 4 and 5.

As shown in FIG. 4, the motor housing 30 has a tilted surface 30a between the base end 24b of the ramp 24 and the electric motor 28. The tilted surface 30a is tilted upward from the base end 24b of the ramp 24 toward the electric motor 28. For example, the tilted surface 30a is tilted at an angle θ2 of about 30 degrees with respect to the ramp 24. An extended plane ES (shown by a dashed line in FIG. 4) extended from a lower surface of the ramp 24 toward the tilted surface 30a of the motor housing 30 intersects the tilted surface 30a. A corner 24c of the base end 24b of the ramp 24 that faces the tilted surface 30a of the motor housing 30 has a chamfered shape. A clearance CL is provided between the motor housing 30 and the floor 12f. The clearance CL is greater than the thickness T of the ramp 24.

As shown in FIG. 5, the tilted surface 30a of the motor housing 30 is partially thicker than the surface of the motor housing 30 that is adjacent to the tilted surface 30a (hereinafter referred to as the "adjacent surface 30b"), although the technology disclosed in the present specification is not particularly limited to this configuration. The rigidity of the tilted surface 30a of the motor housing 30 is thus made higher than that of the adjacent surface 30b of the motor housing 30. The material of the base end 24b of the ramp 24 has higher strength than the material of the distal end 24a of the ramp 24.

In the vehicle 10 as in the present embodiment, the battery unit 20 is located below the floor 12f of the vehicle 10 in order to make more space in the vehicle cabin 12c. However, in the event of, for example, a collision with another vehicle, the ramp 24 stored under the floor 12f may be bent due to a horizontal collision load. In this case, the bent ramp 24 may damage the battery unit 20 that is also located under the floor 12f.

In the vehicle 10 of the present embodiment, when the ramp 24 is in the storage position, the base end 24b of the ramp 24 is adjacent to the electric motor 28 in the horizontal direction. Moreover, the tilted surface 30a that is tilted upward from the base end 24b of the ramp 24 toward the electric motor 28 is located between the base end 24b of the ramp 24 and the electric motor 28. According to this configuration, when the collision load is applied to the distal end 24a of the ramp 24, the ramp 24 is pushed in toward the electric motor 28. At this time, the base end 24b of the ramp 24 is into contact with the tilted surface 30a, so that the ramp 24 is guided obliquely upward along the tilted surface 30a. A compressive force applied to the ramp 24 is thus reduced, and bending of the ramp 24 is reduced. As bending of the ramp 24 is reduced, damage to the battery unit 20 can be avoided or reduced.

In the vehicle 10 of the present embodiment, various measures have been taken to reduce bending of the ramp 24. The measures will be described below. The configurations described below are illustrative only and are not necessarily required.

In the present embodiment, the electric motor 28 is located below the floor 12f, and the clearance CL is provided between the electric motor 28 and the floor 12f. According to this configuration, the ramp 24 guided along the tilted surface 30a of the motor housing 30 can be retracted to a position between the electric motor 28 and the floor 12f. This configuration can further reduce bending of the ramp 24.

In the present embodiment, when the ramp 24 is in the storage position, the extended plane ES extended from the lower surface of the ramp 24 toward the tilted surface 30a of the motor housing 30 intersects the tilted surface 30a. According to this configuration, the ramp 24 can be guided obliquely upward more stably when the ramp 24 is into contact with the tilted surface 30a.

In the present embodiment, the tilted surface 30a of the motor housing 30 has higher rigidity than at least one other surface (e.g., the adjacent surface 30b) of the motor housing 30. This configuration can reduce deformation of the tilted surface 30a that occurs when the ramp 24 is into contact with the tilted surface 30a of the motor housing 30. As a result, the ramp 24 can be guided obliquely upward more stably.

In the present embodiment, the tilted surface 30a of the motor housing 30 is tilted at an angle of, for example, 30 degrees with respect to the ramp 24 in the storage position. The tilt angle θ2 may be, but not particularly limited to, 60 degrees or less or 45 degrees or less. According to this configuration, the ramp 24 can be guided obliquely upward more stably when the ramp 24 is into contact with the tilted surface 30a of the motor housing 30.

In the present embodiment, the base end 24b of the ramp 24 has higher strength than the distal end 24a of the ramp 24. According to this configuration, increasing the strength of the base end 24b of the ramp 24 can reduce deformation of the base end 24b of the ramp that occurs when the base end 24b of the ramp 24 is into contact with the tilted surface 30a of the motor housing 30. As a result, the ramp 24 can be guided along the tilted surface 30a more stably.

In the present embodiment, one or more corners 24c of the base end 24b of the ramp 24 that face the tilted surface 30a of the motor housing 30 may have a chamfered shape. According to this configuration, the ramp 24 can be guided obliquely upward more stably when the ramp 24 is into contact with the tilted surface 30*a*.

Although a specific example of the technology disclosed in the present specification is described in detail above, this is illustrative only and is not intended to limit the scope of the claims. The technology described in the claims includes various modifications and alterations of the specific example illustrated above. Modifications of the tilted surface 30*a* will be described with reference to FIGS. 6 and 7.

First Modification

Figure 6:
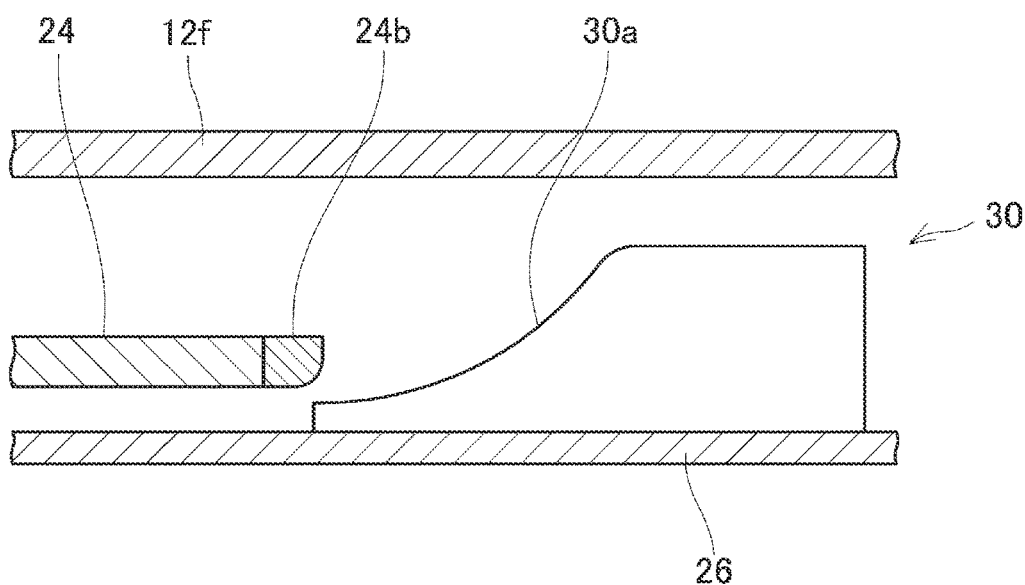

As shown in FIG. 6, the tilted surface 30*a* of the motor housing 30 may be curved concavely as viewed from the ramp 24. According to this configuration, the ramp 24 can be guided obliquely upward more stably when the ramp 24 is into contact with the tilted surface 30*a*.

Second Modification

Figure 7:
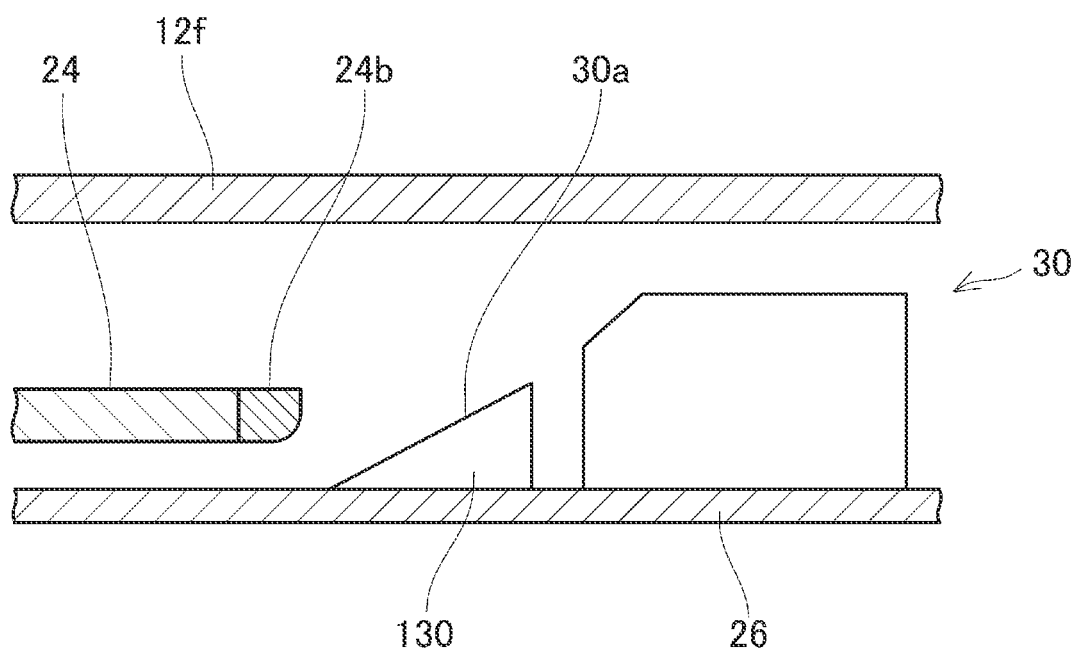

As shown in FIG. 7, a part of the tilted surface 30*a* or the entire tilted surface 30*a* may be provided at a member different from the motor housing 30 between the electric motor 28 and the ramp 24. In the configuration shown in FIG. 7, an upward protruding portion 130 is located in the ramp storage portion 26, and a part of the tilted surface 30*a* is provided at the protruding portion 130, although the technology disclosed in this specification is not particularly limited to this. In this case as well, the ramp 24 is guided obliquely upward along the tilted surface 30*a* when the base end 24*b* of the ramp 24 is into contact with the tilted surface 30*a*.

The technical elements illustrated in the present specification or the drawings have technical utility alone or in various combinations, and are not limited to the combinations described in the claims as originally filed. The technology illustrated in the present specification or the drawings can achieve a plurality of objects at the same time, and has technical utility by achieving one of the objects.

What is claimed is:

1. A vehicle comprising:
    a floor where an occupant is located during a ride in the vehicle;
    a high voltage unit located below the floor;
    a ramp configured to move between an in-use position where the ramp extends between the floor and ground and a storage position where the ramp is stored at a position between the high voltage unit and the floor; and
    an actuator that moves the ramp between the in-use position and the storage position, wherein:
    the ramp includes a distal end that contacts the ground when the ramp is in the in-use position, and a base end located on an opposite side of the ramp from the distal end;
    when the ramp is in the storage position, the base end of the ramp is adjacent to the actuator in a horizontal direction; and
    an impact prevention surface is disposed adjacent to the actuator, the impact prevention surface having an upwardly inclined surface configured to raise the base end of the ramp and prevent the ramp from impacting the actuator.

2. The vehicle according to claim 1, further comprising an actuator housing that houses the actuator, wherein the tilted surface is provided at the actuator housing.

3. The vehicle according to claim 2, wherein the tilted surface has higher rigidity than at least one other surface of the actuator housing.

4. The vehicle according to claim 1, wherein the actuator is an electric motor.

5. The vehicle according to claim 1, wherein the actuator is located below the floor, and there is a clearance between the actuator and the floor.

6. The vehicle according to claim 1, wherein when the ramp is in the storage position, an extended plane extended from a lower surface of the ramp toward the tilted surface intersects the tilted surface.

7. The vehicle according to claim 1, wherein the tilted surface is tilted at an angle of 60 degrees or less with respect to the ramp in the storage position.

8. The vehicle according to claim 1, wherein the tilted surface is curved concavely as viewed from the ramp.

9. The vehicle according to claim 1, wherein a corner of the base end of the ramp that faces the tilted surface has a chamfered shape.

10. The vehicle according to claim 1, wherein the base end of the ramp has higher strength than the distal end of the ramp.

11. The vehicle according to claim 1, further comprising a motor that drives a wheel, wherein the high voltage unit is a battery unit that supplies power to the motor.

12. The vehicle according to claim 1, wherein, when the ramp is in the storage position, a clearance is present between the base end of the ramp and the actuator.

\* \* \* \* \*